July 30, 1929. H. BEGHIN ET AL 1,722,888
GYROSCOPIC COMPASS
Filed Jan. 5, 1924   2 Sheets-Sheet 2

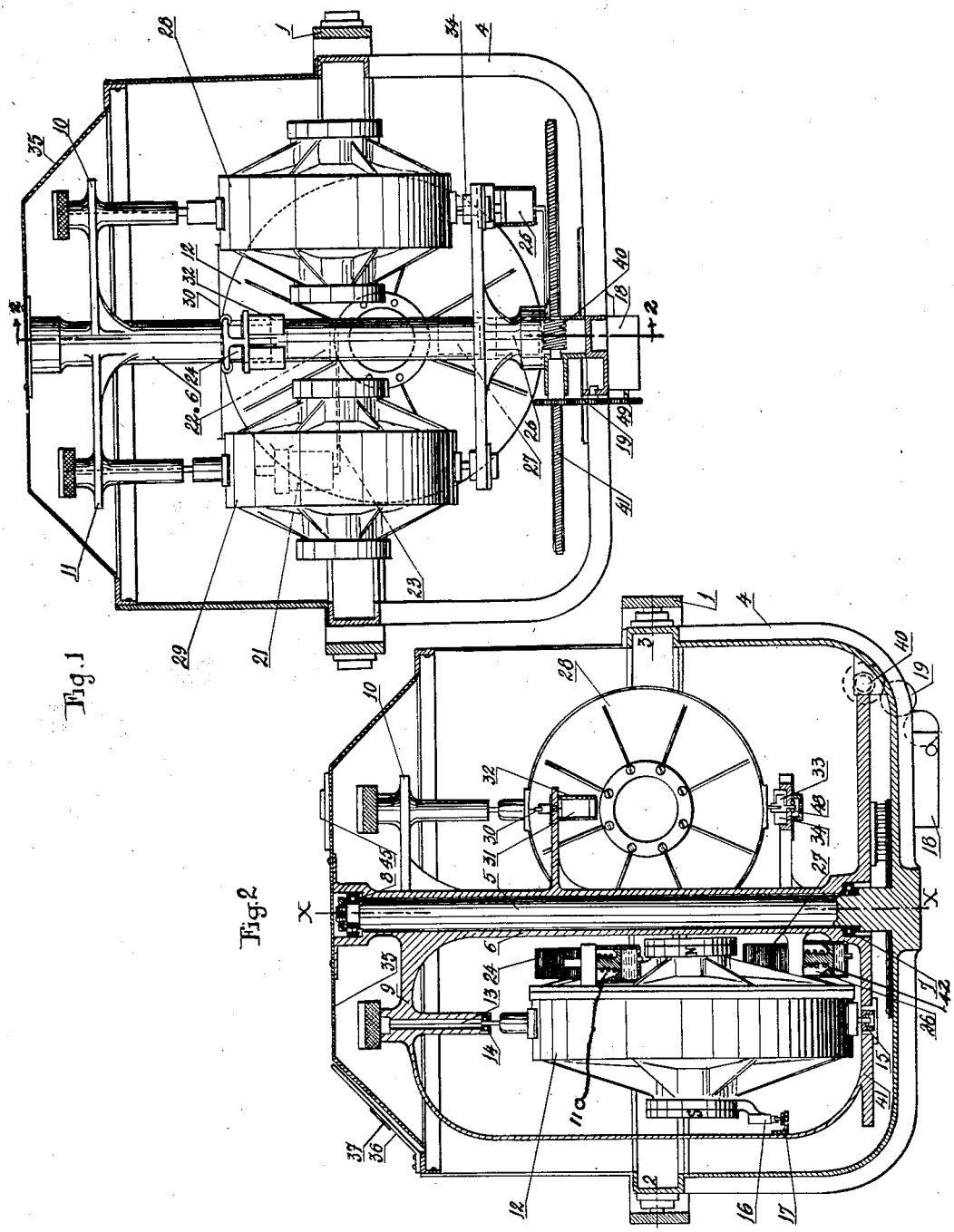

Inventors
H. Beghin & P. Monfraix
By Marks Clerk
Attys.

Patented July 30, 1929.

1,722,888

UNITED STATES PATENT OFFICE.

HENRI BEGHIN AND PAUL MONFRAIX, OF PARIS, FRANCE.

GYROSCOPIC COMPASS.

Application filed January 5, 1924, Serial No. 684,590, and in France January 17, 1923.

The perturbations to which a gyroscopic compass may be subjected on board a ship or airplane, due to change of speed or rolling, modify the apparent vertical, that is the direction of the vector resulting from the acceleration of the vessel and the acceleration of gravity.

The variations which take place for the compass are due on the one hand to the influence of the damping system, and on the other hand to the lack of stability of the pendular part in the east-west vertical. It is thus necessary to increase this stabilization to the greatest possible extent and to decrease the injurious effects of the damping system as much as possible.

The invention has for its object to realize this double condition and relates to gyroscopic compasses comprising two distinct elements:

a. A directing gyroscope.

b. A pendulum whose oscillation in the vertical east-west is stabilized by means of auxiliary gyroscopes suspended from the same support as the directing gyroscope.

In accordance with the invention there is provided a damping device, comprising an additional mass placed at the east on the casing of the directing gyroscope and a second additional mass balancing the first and located on the support; this support is, in addition, operated by a servo-motor according to the relative displacements of the directing gyroscope.

The appended drawings show by way of example an embodiment of the invention.

Fig. 1 is an elevational view of the apparatus, perpendicular to the meridian plane.

Fig. 2 is a sectional view through the meridian.

Figure 3:
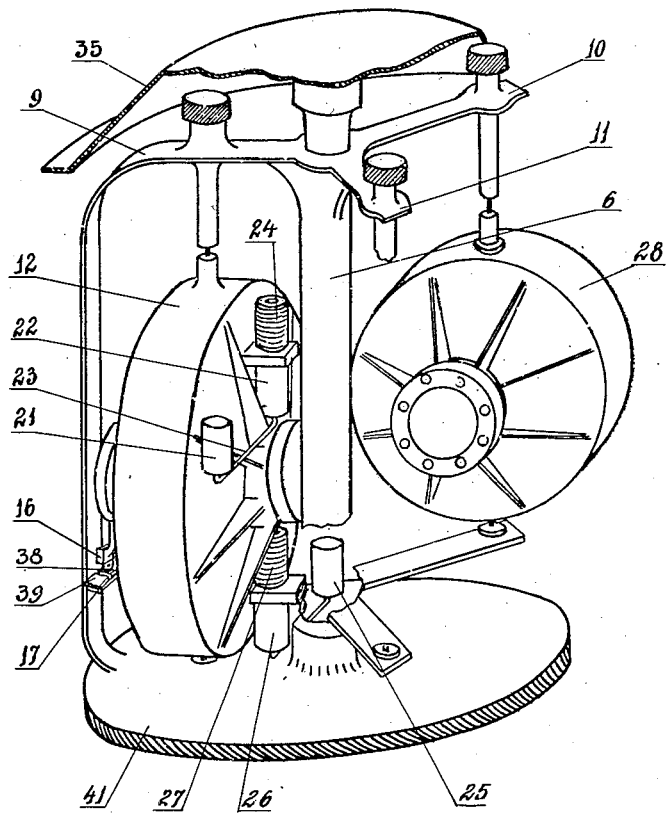
Fig. 3 is a perspective view showing the apparatus, the external casing and one of the auxiliary gyroscopes being removed for sake of clearness.

In the gyroscopic compass shown in Figs. 1 to 4, the circular element 1 of a cardan suspension device has, movable on the axis 2, 3 a cross-arm 4 to which is secured a shaft 5. The support 6 holding the gyroscopes is revoluble on said shaft and rests thereon through the medium of a thrust ball-bearing 7 and an ordinary ball-bearing 8; said support includes three arms 9, 10, 11 of which the first has attached thereto the directing gyroscope 12 and the two others the auxiliary gyroscopes 28, 29 respectively.

Figure 4:
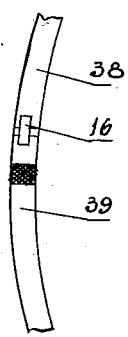
Fig. 4 is a plan view showing a detail.

The directing gyroscope 12 is suspended from the arm 9 by means of a set of wires 13 having but a slight torsion, and it is guided by two small ball-bearings 14, 15; said gyroscope is provided with a trolley 16 rolling upon a rail consisting of the two contact pieces 38, 39, Fig. 4, held by a bracket 17 mounted on the support 6. The said contact pieces are each connected in a circuit including a source of current which supplies an electric servo-motor 18 whose main frame is secured to the cross-arm 4. The shaft 49 of said motor drives through the medium of gearing 19 a worm 40 engaging a worm wheel 41 mounted on the support 6 and imparting thereto the movement of the motor 18.

The casing of the directing gyroscope 12 is provided with a mercury cup 21 placed to the east of its axis of rotation and also a mercury cup 22 connected with the cup 21 by a tube 23. A piston which is secured to the suction core of a solenoid 24 and is urged downwardly by a spring 110 will exert a sufficient pressure upon the upper surface of the mercury contained in the cup 22, by which pressure the mercury will be maintained at a certain level in the cup 21 and will thus unbalance the gyroscope by constituting an additional mass placed to the east.

Mounted on the support 6 is a similar device comprising two communicating mercury cups 25 and 26, the latter being provided with a piston 42 controlled by a solenoid 27. The cups 22 and 26 are in the vertical plane through the spin-axis of the directing gyroscope 12.

When the directing gyroscope 12 is in its middle position shown in Fig. 2, the cups 21, 22 with the solenoid 24 balance the cups 25, 26 with the solenoid 27 in a vertical plane passing through the axis of the said solenoids 24 and 27 and normal to the plane of Fig. 2. Besides the weights of the various elements are arranged in such a manner that the center of gravity of the whole is on the vertical axis of rotation X X.

The solenoids 24 and 27 are connected in parallel in the circuit of a source of electricity with a common circuit controller which permits the operator to energize or de-energize the two electromagnets.

The pendulum which is stabilized in the east-west vertical direction comprises two like auxiliary gyroscopes 28, 29 having horizontal axes and their kinetic moments opposed to each other. Said gyroscopes are suspended respectively from the arms 10, 11 by means of wires having but a slight torsion, and are adapted to oscillate on the said wires, each being guided in its oscillation by two small ball-bearings such as 48 (Fig. 2).

In order to urge each of the auxiliary gyroscopes 28, 29 into its normal position of equilibrium, in which its axis is perpendicular to the meridian and to the axis of the directing gyroscope 12 we have provided a wire 30 supporting at its end a counterweight 31 movable in a cylinder 32. The energy of the oscillation is dissipated by a flat member 33 attached to the gyroscope casing and movable within a box 34 containing oil.

By filling the cylinder 32 with oil we obtain a more effective damping of oscillations of great amplitude.

The said arrangement of two auxiliary gyroscopes 28, 29 will thus constitute a pendulum whose oscillation in the east-west vertical plane has a very long period and is suitably damped.

The apparatus is completed by a reading device placed at the upper part. Upon the support 6 is mounted a wind card 35, whose graduation consists of lines drawn between a pair of circles. Above the wind card is disposed the graduated ruler 36 which is secured to the cross-arm 4 and is placed in the line of the vessel's course. The said ruler is provided with a slide 37 carrying cross wires (not shown).

The operation of the apparatus is as follows:

When a movement of the directing gyroscope 12 takes place with respect to the vessel, due to the motion of the vessel, one or the other of the contact pieces 38, 39 will come into contact with the trolley 16 and the motor 18 will be operated in one or the other direction. Through the medium of the transmission parts 19, 40, 41 the support 6 is moved in conjunction with the directing gyroscope, and this motion ceases when the trolley comes into a position between the contact pieces 38 and 39.

The circuit of the solenoids 24 and 27 is normally broken, and if the compass is inclined to the vertical the loads formed by the two masses of mercury will have contrary effects, except upon the directing gyroscope 12 which will be urged towards the horizontal position by the load thereupon. A damping action will therefore ensue.

When the vessel is to make a considerable movement the switch controlling the solenoids 24 and 27 is closed, and the level of the mercury will therefore rise in the cups 22 and 26 and fall in the cups 21 and 25, but without any change in the equilibrium of the whole device, and this will obviate all damping action of the additional masses. Thus it is evident that the liquid is transferred during periods of undue ballistic deviations from a position remote from the shaft 6 (cups 22 and 26) to one substantially adjacent thereto (cups 21 and 25). In this manner we are enabled to dispense with the chief ballistic deviation whenever this may be desired.

On the contrary, when such movements of the vessel no longer occur, the circuit of the solenoids 24, 27 is broken, and this re-establishes the action of the damping arrangement.

The course followed by the vessel is ascertained by means of the cross wires of the slide 37 and the wind card 35.

Obviously, the invention is not limited to the embodiment herein described with reference to the appended drawings, and the same is susceptible of all desired modifications without departing from the spirit of the invention. For instance the oscillations of the compass can be damped by the use of an additional mass placed upon the directing gyroscope and in the direction of the west with respect to its north pole, said mass being compensated by a like mass placed upon the support the motion of which is controlled by the directing gyroscope by means of a servomotor. The additional mass may be in a fixed position, in which case there are no means for eliminating during turning or change of speed. The said additional weight may be also movable, and can consist of a liquid mass which is displaced by distant control, or of a solid mass placed on the directing gyroscope for damping purposes or upon the support in order to eliminate this damping.

To stabilize the pendulum in the vertical east-west position, we may employ, as in the arrangement described, two auxiliary gyroscopes whose kinetic moments are equal and contrary in the east-west plane; but a like result may be obtained by the use of a single gyroscope which is disposed as in the preceding case and whose kinetic moment is in this plane.

We claim:

1. A gyroscopic compass including a directing gyroscope and a pending stabilizer including auxiliary gyroscopes and oscillating in the east-west vertical, a support common to the directing gyroscope and stabilizer, a damping device consisting of a mass on the casing of the directing gyroscope on the east side, a second mass provided on the support to balance the damping mass, the moment of both masses relatively to the rotating axis of the directing gyroscope being equal to each other, and manually operable control means for shifting the masses toward the spin-axis of the directing gyroscope whereby ballistic deviations may be obviated.

2. A gyroscopic compass including a directing gyroscope and a pending stabilizer including auxiliary gyroscopes and oscillating in the east-west vertical, a support common to the directing gyroscope and stabilizer, a damping device consisting of two communicating cups mounted on the directing gyroscope and adapted to contain a liquid mass, a piston in one of the cups, a second liquid mass, additional communicating cups mounted on the gyroscope support and adapted to contain the liquid mass so as to balance the liquid mass of the damping device, a piston in one of the last mentioned cups, the moment of both liquid masses relatively to the rotating axis of the directing gyroscope being equal to each other, and electromagnetic means controlling said pistons for displacing the liquid mass from one cup to the other.

In witness whereof we affix our signatures.

HENRI BEGHIN.
PAUL MONFRAIX.